(12) United States Patent
Takaya et al.

(10) Patent No.: US 11,474,303 B2
(45) Date of Patent: Oct. 18, 2022

(54) OPTICAL CONNECTOR FERRULE, SLEEVE, AND METHOD FOR MANUFACTURING FERRULE MEMBER

(71) Applicant: Nippon Telegraph and Telephone Corporation, Tokyo (JP)

(72) Inventors: Masaaki Takaya, Tokyo (JP); Yoshiteru Abe, Tokyo (JP); Ryo Koyama, Tokyo (JP); Chisato Fukai, Tokyo (JP); Kazunori Katayama, Tokyo (JP); Kazuhide Nakajima, Tokyo (JP); Yusuke Yamada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/279,980

(22) PCT Filed: Sep. 11, 2019

(86) PCT No.: PCT/JP2019/035716
§ 371 (c)(1),
(2) Date: Mar. 25, 2021

(87) PCT Pub. No.: WO2020/066628
PCT Pub. Date: Apr. 2, 2020

(65) Prior Publication Data
US 2021/0389528 A1    Dec. 16, 2021

(30) Foreign Application Priority Data

Sep. 25, 2018    (JP) .............................. JP2018-179106

(51) Int. Cl.
*G02B 6/38*    (2006.01)

(52) U.S. Cl.
CPC .......... *G02B 6/3838* (2013.01); *G02B 6/3851* (2013.01); *G02B 6/3863* (2013.01); *G02B 6/3874* (2013.01); *G02B 6/3882* (2013.01)

(58) Field of Classification Search
CPC ... G02B 6/3851; G02B 6/3838; G02B 6/4249
See application file for complete search history.

(56) References Cited

U.S. PATENT DOCUMENTS

| 5,980,117 | A | * | 11/1999 | Feuer | .................. | G02B 6/4249 385/59 |
| 6,280,098 | B1 | * | 8/2001 | Alcock | ................ | G02B 6/3874 385/64 |

(Continued)

FOREIGN PATENT DOCUMENTS

| JP | 2010-266826 | 11/2010 |
| JP | 2013-195528 | 9/2013 |

(Continued)

*Primary Examiner* — Eric Wong
(74) *Attorney, Agent, or Firm* — Fish & Richardson P.C.

(57) ABSTRACT

An object is to provide an optical fiber connector ferrule, a sleeve, and a method for manufacturing a ferrule member that can avoid an increase in manufacturing time and an increase in cost of optical connectors for connecting multi-core optical fibers. The present invention provides an optical fiber connector ferrule, a sleeve, and a method for manufacturing ferrule member which realizes alignment of multicore optical fibers corresponding to the connection by mounting a ferrule on a multicore fiber and then cutting a ferrule member instead of aligning core positions by rotating an axis of an optical fiber and adjusting positions of cores to the ferrule, leading to simplification of a rotational alignment step.

7 Claims, 12 Drawing Sheets

(56) References Cited

U.S. PATENT DOCUMENTS

| | | | |
|---|---|---|---|
| 10,564,363 B1* | 2/2020 | Corl | G02B 6/32 |
| 2004/0114865 A1* | 6/2004 | Ryall | G02B 6/2937 |
| | | | 385/39 |
| 2014/0178013 A1* | 6/2014 | Nielson | G02B 6/3861 |
| | | | 385/83 |

FOREIGN PATENT DOCUMENTS

| | | |
|---|---|---|
| JP | 2013-238692 | 11/2013 |
| WO | WO 2013/172322 | 11/2013 |

* cited by examiner

OPTICAL CONNECTOR FERRULE, SLEEVE, AND METHOD FOR MANUFACTURING FERRULE MEMBER

CROSS-REFERENCE TO RELATED APPLICATIONS

This application is a National Stage application under 35 U.S.C. § 371 of International Application No. PCT/JP2019/035716, having an International Filing Date of Sep. 11, 2019, which claims priority to Japanese Application Serial No. 2018-179106, filed on Sep. 25, 2018. The disclosure of the prior application is considered part of the disclosure of this application, and is incorporated in its entirety into this application.

BACKGROUND ART

Figure 1:
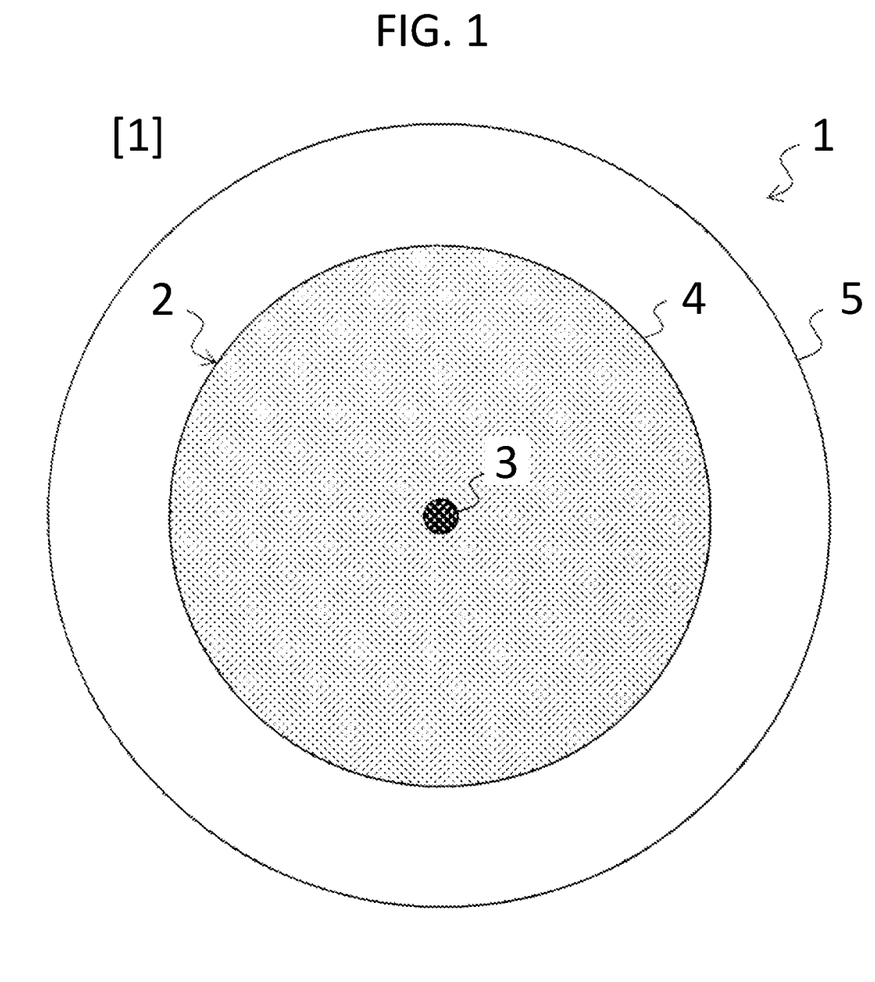
FIG. 1 is a view illustrating a cross section of an optical fiber.

At present, SM type optical fibers are widely used in fiber-optic communication networks. As shown in FIG. 1, in an optical fiber 2 which is currently in use, glass with a high refractive index of about 10 μm, called core 3, is present in a central portion of narrow glass of 125 μm, called cladding 4, and optical signals propagate in the core 3. Further, since the optical fiber 2 is vulnerable to damage, a periphery thereof is protected by a UV coating 5, and the optical fiber protected by the coating 5 is called an optical fiber core wire 1.

Figure 2:
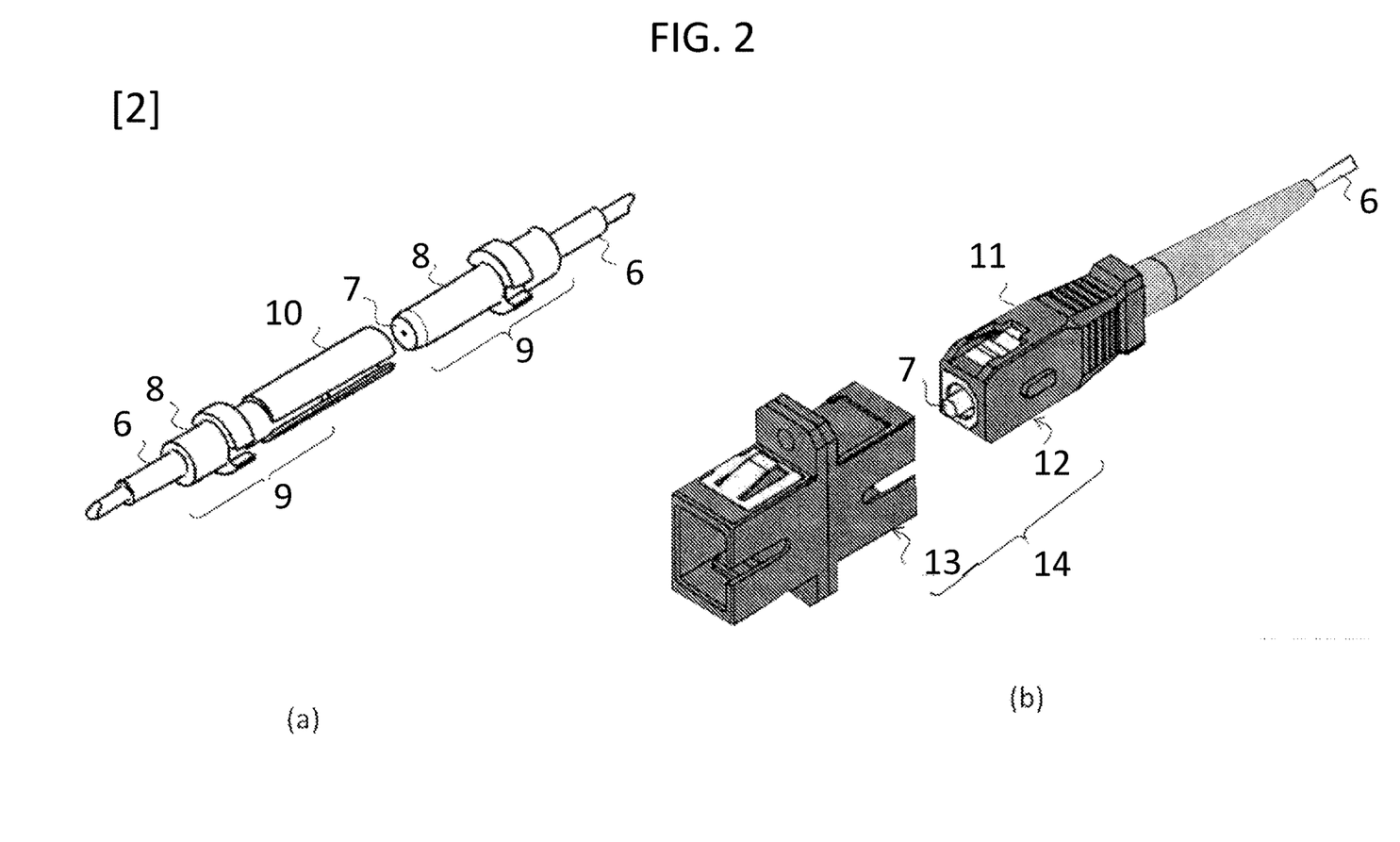
FIG. 2 is a view illustrating a structure of the optical fiber, in which (a) illustrates an internal structure of the optical connector and (b) illustrates an external housing of the optical connector.

An optical connector having a function of connecting these optical fibers to each other has a mechanism, as shown in FIG. 2(a), in which an optical fiber core wire 6 is highly-precisely fixed to a member called a ferrule 8 to provide a ferrule member 9, the ferrule member 9 is guided by a sleeve 10, and optical fiber end faces 7 fixed to the ferrules 8 respectively are connected to each other. Further, to facilitate these connections, as shown in FIG. 2(b), the ferrule is mounted in a housing 11, and the sleeve is mounted in an adapter 13. The ferrule mounted in the housing is referred to as an optical connector plug 12, and a set of this plug and the adapter 13 with the sleeve mounted therein is referred to as an optical connector 14.

Figure 3:
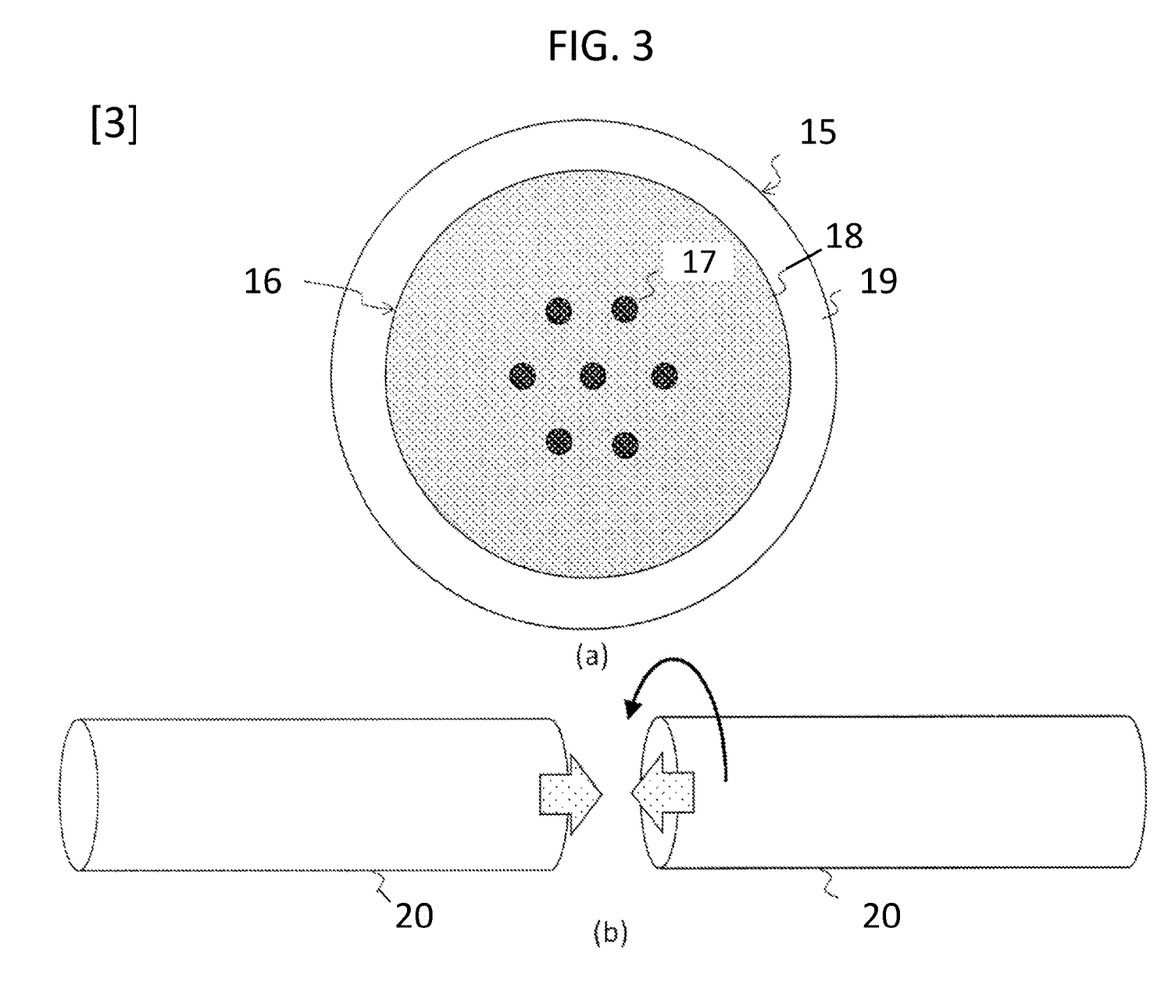
FIG. 3(a) is a view illustrating a cross section of a multicore optical fiber.
FIG. 3(b) illustrates a rotational alignment step.

On the other hand, in each of multicore optical fibers, which have recently been researched and developed as a countermeasure for an increase in communication traffic capacity, a plurality of core portions in which optical signals propagate are present inside the cladding. For example, in such a multicore optical fiber 16 having seven cores as shown in FIG. 3(a), the number of transmission paths is seven times higher than that of a normal SM type optical fiber. Since the multicore optical fiber has a plurality of transmission paths present therein as described above, it has an advantage of increasing a transmission capacity as compared to the normal SM type optical fiber.

While the multicore optical fiber has the advantage described above, it has a drawback of a difficulty in connection. The biggest problem in connecting the optical fibers is the misalignment between the optical fibers to be connected. The normal optical fiber has only one core through which optical signals are transmitted, but multicore optical fiber has a plurality of cores, and thus requires adjustments in a rotational direction in addition to adjustments required to connect the normal optical fibers (FIG. 3(b)). Therefore, the manufacture of the optical connectors that connect the multicore optical fibers requires an additional step of adjusting the rotational direction, which increases a manufacturing time and costs.

Various technologies have been conventionally suggested as methods for aligning the cores of the multicore optical fiber. For example, in Patent Literature 1, a rotation device for multicore optical fibers is suggested. The rotation device achieves appropriate alignment of multicore optical fibers in ferrules to be mounted in an SC connector.

CITATION LIST

Patent Literature

Patent Literature 1: Japanese Patent Laid-Open No. 2013-238692

SUMMARY OF THE INVENTION

Technical Problem

Even if the technology of Patent Literature 1 is introduced, the step of adjusting a rotational direction, in which the alignment of the optical fibers is performed by rotating the optical fibers in the ferrules, remains, and thus there is a problem of a difficulty in avoiding an increase in optical connector manufacturing time and an increase in cost.

To solve the problem, it is an object of the present invention to provide an optical fiber connector ferrule, a sleeve, and a method for manufacturing a ferrule member that can avoid an increase in manufacturing time and an increase in cost of optical connectors for connecting multicore optical fibers.

Means for Solving the Problem

To achieve the object, an optical fiber connector ferrule according to the present invention has a structure which enables cutting a ferrule member after mounting a multicore optical fiber.

Specifically, an optical fiber connector ferrule according to the present invention includes:

a cylindrical member through which a coated optical fiber core wire including a plurality of cores extends;

a V-groove arranged on one bus of the cylindrical member; and a cut portion formed on a side surface of the cylindrical member so as to be parallel to a bottom surface of the cylindrical member.

Further, a method for manufacturing a ferrule member according to the present invention includes:

inserting the coated optical fiber core wire into the cylindrical member of the optical connector ferrule;

cutting the cylindrical member at the cut portion with the coated optical fiber core wire extending through the cylindrical member after the inserting; and polishing cutting planes of the cylindrical member including the coated optical fiber core wire cut at the cutting.

Furthermore, at the time of connecting the multicore optical fibers, it is preferable to use a sleeve including: a guide hole into which the optical connector ferrule is inserted, the optical connector ferrule having been cut at the cut portion with the coated optical fiber core wire extending through the cylindrical member; and an alignment pin arranged in the guide hole and fitted in the V-groove.

Since the ferrule member is cut in a state where the multicore optical fiber has been mounted in the ferrule, the cores are perfectly aligned on both the cutting planes, adjusting a rotational direction is no longer necessary when connecting these fibers. Thus, the present invention can provide the optical fiber connector ferrule, the sleeve, and the method for manufacturing a ferrule member that can avoid an increase in manufacturing time and an increase in cost of optical connectors for connecting multicore optical fibers.

The cylindrical member of the optical fiber connector ferrule according to the present invention is preferably configured to be divided into two in a plane including a central axis. At the inserting, dividing the cylindrical member in the plane including the central axis into two and sandwiching the coated optical fiber core wire by halved cylindrical members obtained by the dividing to insert the coated optical fiber core wire into the cylindrical member can avoid the inconvenience of inserting the same into the optical fiber connector ferrule from one end of the multicore optical fiber.

In the method for manufacturing a ferrule member, it is preferable to perform stretching to arrange the plurality of cores of the coated optical fiber core wire without a twist, and to perform the inserting, the cutting, and the polishing to a plurality of points in the longitudinal direction of the coated optical fiber core wire after the stretching.

Eliminating the twist of the cores in the multicore optical fiber allows the cores to be aligned in any of the cutting planes, and the adjusting the rotational direction is no longer necessary for the connection of members other than the ferrule members formed by cutting the optical fiber connector ferrule.

The cylindrical member of the optical fiber connector ferrule according to the present invention preferably has a protrusion on an intersection line of a plane including the cut portion and an inner wall, the protrusion being configured to enter a side surface of the coated optical fiber core wire. When the optical fiber connector ferrule is mounted on the multicore optical fiber, the protrusion enters the coating, thereby facilitating the cutting of the multicore optical fiber.

Effects of the Invention

The present invention can provide the optical fiber connector ferrule, the sleeve, and the method for manufacturing a ferrule member that can avoid an increase in manufacturing time and an increase in cost of optical connectors for connecting multicore optical fibers.

DESCRIPTION OF EMBODIMENTS

Embodiments according to the present invention will be described with reference to the accompanying drawings. The embodiments described below are examples of the present invention, and the present invention is not restricted to the following embodiments. It should be noted that constituent elements with the same sign in the specification and the drawings are identical to each other.

As a method for mounting a multicore optical fiber in a ferrule in a process of fabricating a multicore optical connector, according to a conventional technology, after mounting the ferrule on the cut multicore optical fiber, core positions to the ferrule are aligned by rotating an axis of the optical fiber, thereby aligning the core positions. As different from the conventional technology, the present invention realizes the alignment of the multicore optical fibers corresponding to the connection by mounting the ferrule on the multicore optical fiber and then cutting a ferrule member. In this case, an optical connector plug having the ferrule mounted therein, fabricated using this technique, would be an optical connector applicable only to the optical connector plugs in question, but an optical connector which can be used as a limited use application can be realized.

Embodiment 1

Details of the technology will be described below.

Figure 4:
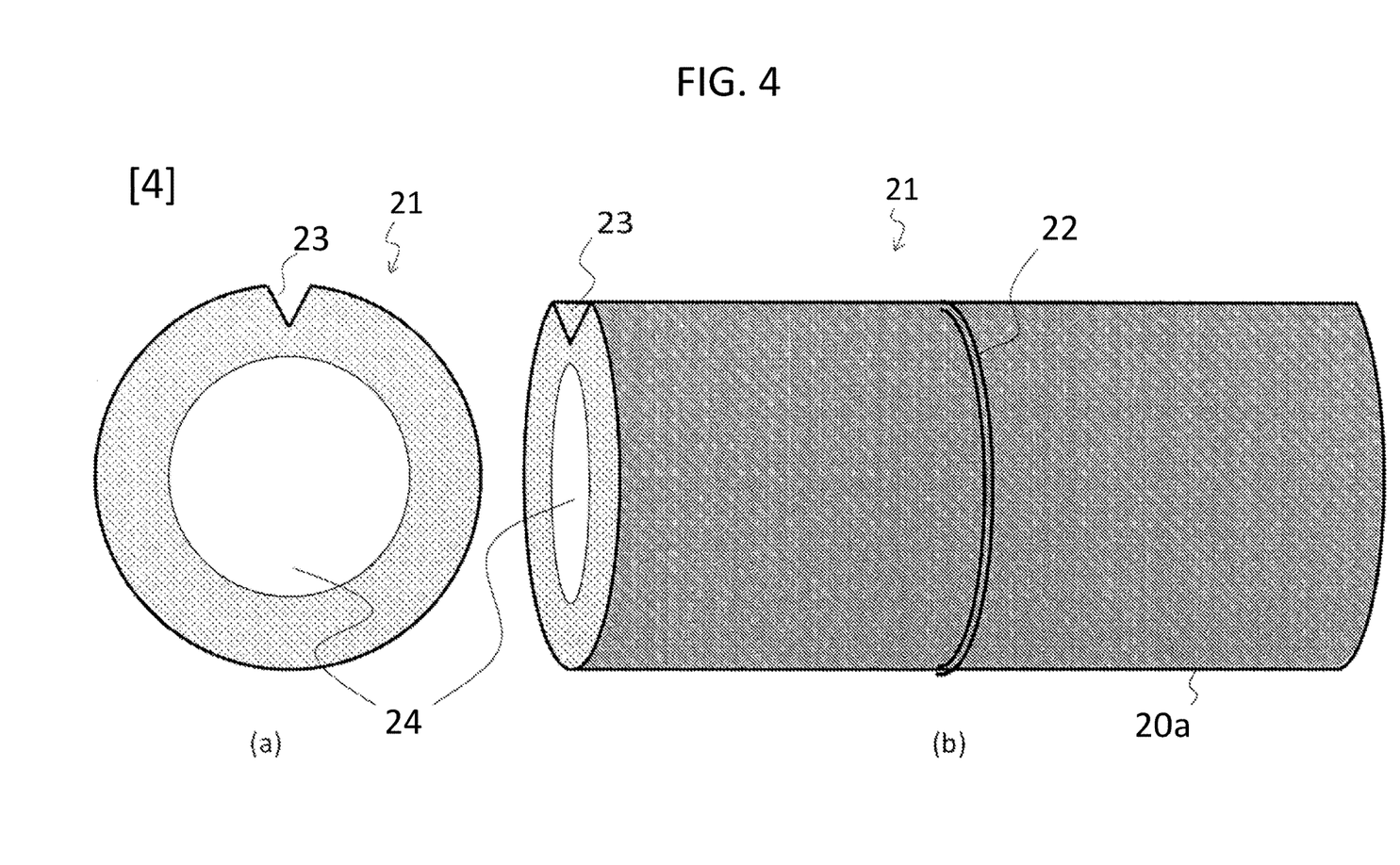
FIG. 4 is a view illustrating an optical connector ferrule according to the present invention, in which (a) is a front view and (b) is a perspective view.

FIG. 4 is a view illustrating an optical connector ferrule 21 according to this embodiment. The optical connector ferrule 21 includes:

a cylindrical member 20a through which a coated optical fiber core wire including a plurality of cores extends;

a V-groove 23 arranged on one bus of the cylindrical member; and a cut portion 22 formed on a side surface of the cylindrical member so as to be parallel to a bottom surface of the cylindrical member.

The optical connector ferrule 21 has the cylindrical member 20a like a normal optical connector ferrule. An optical fiber through hole 24 is formed in a central portion of the cylindrical member 20a, and a multicore optical fiber is inserted here. Although a bore diameter of the optical fiber through hole 24 is 125 µm in a normal ferrule, the optical connector ferrule 21 has a shape larger than that (e.g., 250 µm) for the insertion of a coated optical fiber. The ferrule cut portion 22 is formed at the center of the side surface of the cylindrical member 20a, which has a configuration to enable dividing the ferrule 21 into left and right parts together with the optical fiber (e.g., a notched shape). Further, the alignment V-groove portion 23 is formed on a side surface of the ferrule 21, so that even after the ferrule 21 is divided, a position before the division can be recognized.

Figure 5:
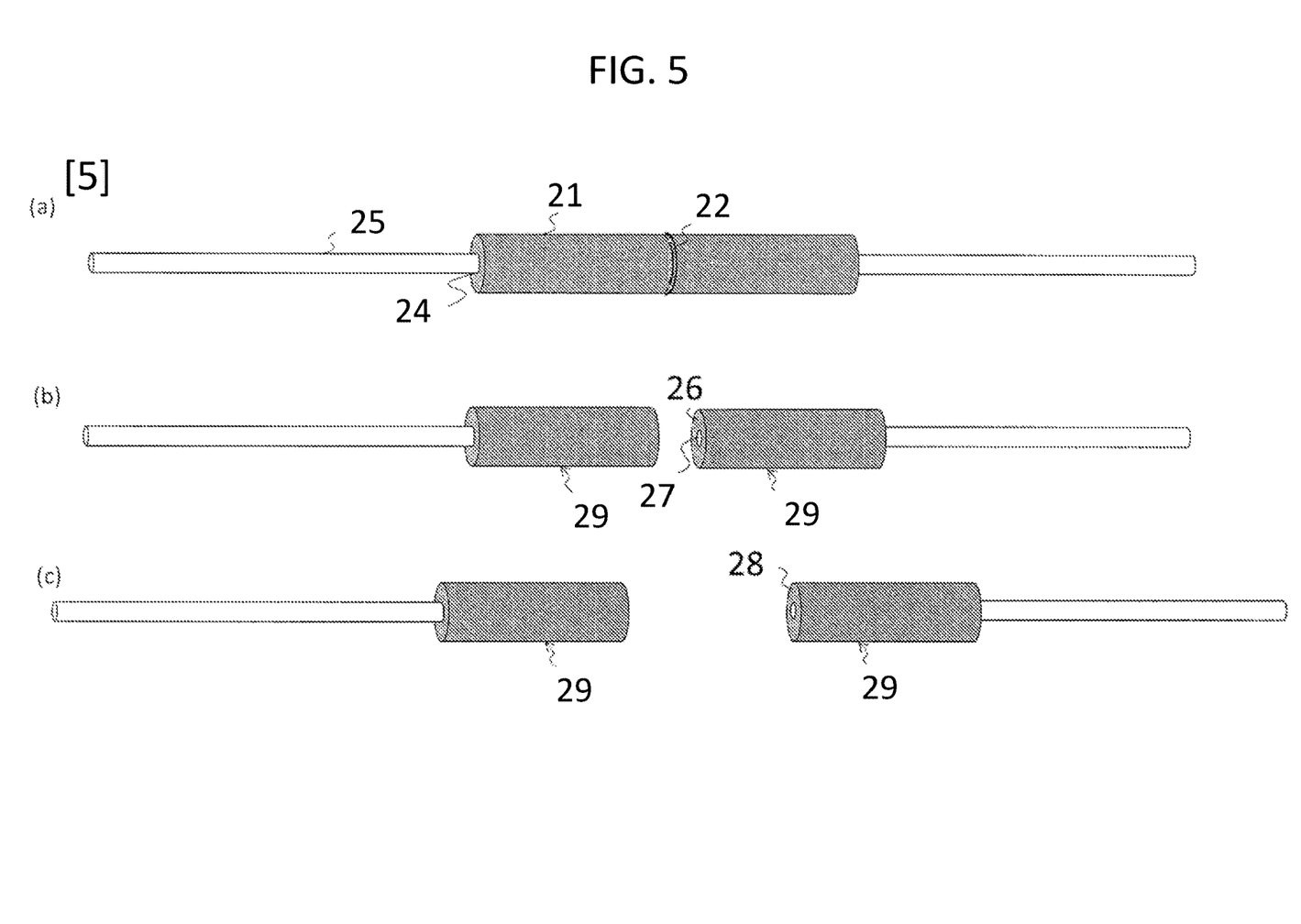
FIG. 5 is a view illustrating a method for manufacturing a ferrule member according to the present invention.

FIG. 5 is a view illustrating a method for manufacturing a ferrule member 29 using the optical connector ferrule 21.

This manufacturing method includes:

inserting (a) a coated optical fiber core wire 25 into the cylindrical member 20a of the optical connector ferrule 21;

cutting (b) the cylindrical member 20a at the cut portion 22 with the coated optical fiber core wire 25 extending through the cylindrical member 20a after the inserting; and polishing (c) cutting planes (26, 27) of the cylindrical member 20a including the coated optical fiber core wire 25 cut at the cutting.

At the inserting (a), the multicore optical fiber 25 is inserted into the optical fiber through hole 24 of the optical connector ferrule 21. At the cutting (b), the ferrule 21 is divided into two at the ferrule cut portion 22 with the optical fiber inserted. In the ferrule cutting plane 26, a multicore optical fiber cutting plane 27 is included. At the polishing (c), the ferrule cutting plane 26 is polished for an optical connector to form a ferrule end face 28. Consequently, a multicore optical fiber ferrule member 29 is fabricated.

Embodiment 2

Figure 6:
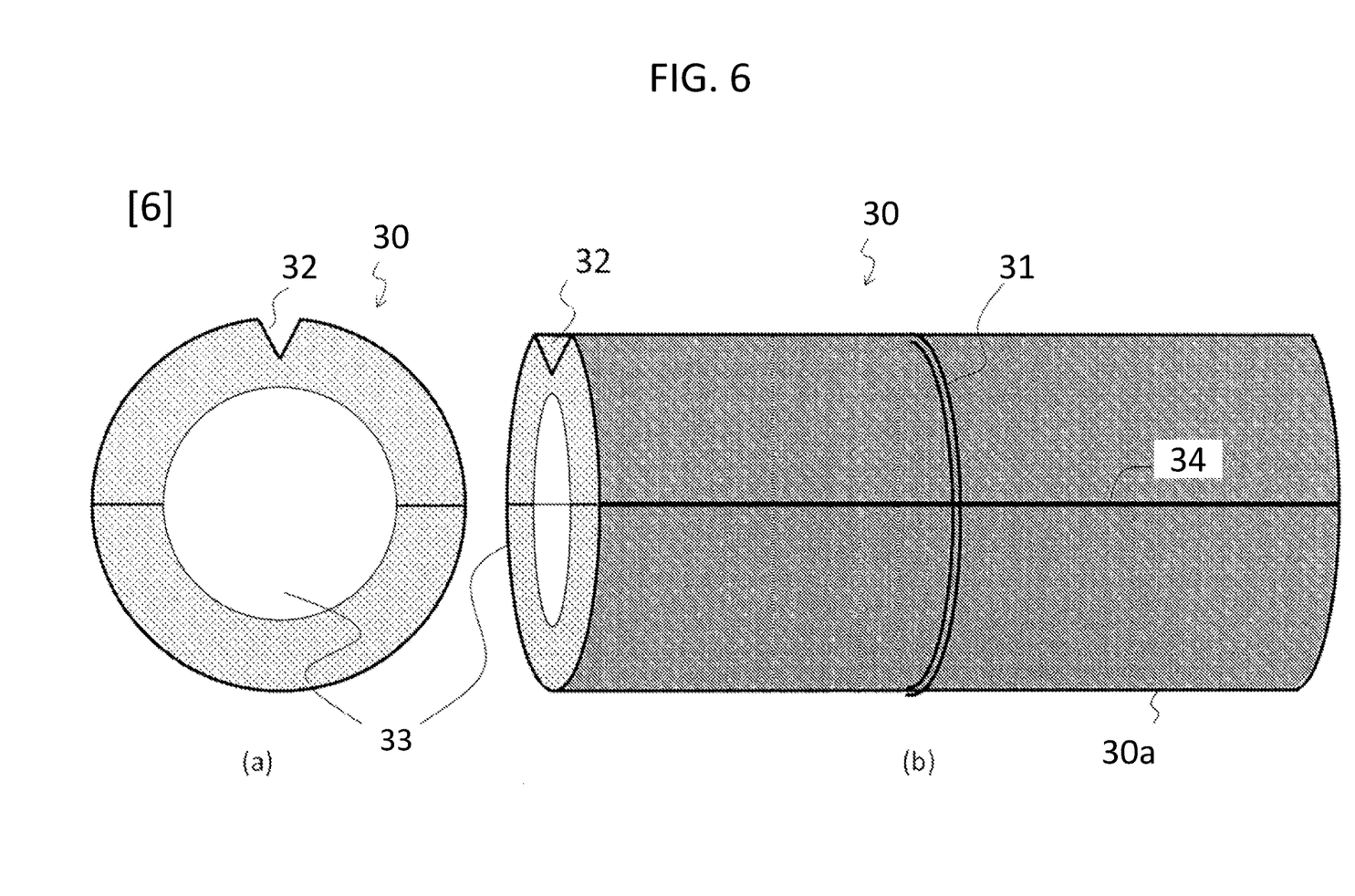
FIG. 6 is a view illustrating the optical connector ferrule according to the present invention, in which (a) is a front view and (b) is a perspective view.

FIG. 6 is a view illustrating an optical connector ferrule 30 according to this embodiment. The optical connector ferrule 30 is characterized in that the cylindrical member of the optical connector ferrule 21 described in Embodiment 1 is configured to be divided into two in a plane including a central axis.

The optical connector ferrule 30 has a cylindrical member 30a like the optical connector ferrule 21. An optical fiber through hole 33 is formed in a central portion of the cylindrical member 30a, and a multicore optical fiber is inserted here. A bore diameter of the optical fiber through hole 33 is the same as that of the optical connector ferrule 21 according to Embodiment 1. Further, like the optical connector ferrule 21 according to Embodiment 1, a ferrule cut portion 31 is formed at the center of a side surface of the cylindrical member 30a, and an alignment V-groove portion 32 is formed on the side surface of the cylindrical member 30a.

Furthermore, the optical connector ferrule 30 is configured so that the cylindrical member 30a can be divided up and down with respect to the figure at a division portion 34. Therefore, instead of inserting the multicore optical fiber into the optical fiber through hole 33 in manufacturing, the multicore optical fiber can be set with the cylindrical member 30a divided.

Figure 7:
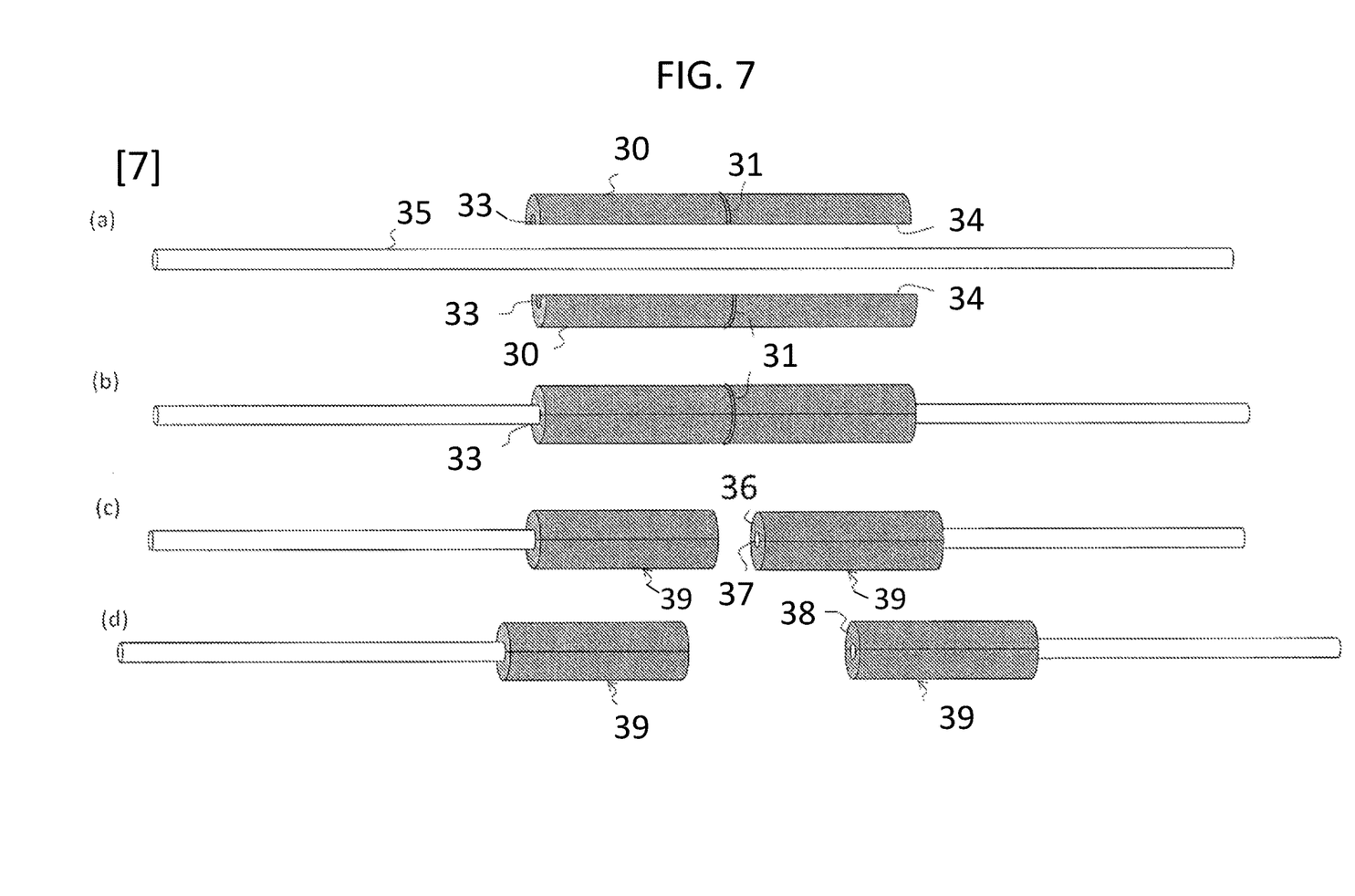
FIG. 7 is a view illustrating the method for manufacturing a ferrule member according to the present invention.

FIG. 7 is a view illustrating a method for manufacturing a ferrule member 39 using the optical connector ferrule 30.

This manufacturing method is characterized in that, at the inserting described with reference to FIG. 5, the cylindrical member is divided into two in the plane including the central axis and the coated optical fiber core wire is sandwiched by halved cylindrical members obtained by the dividing to insert the coated optical fiber core wire into the cylindrical member (a step (a)).

A multicore optical fiber 35 is set in the optical fiber through hole 33 of the optical connector ferrule 30. At that time, the ferrule 30 is divided into two at the division portion 34 so that the optical fiber can be easily set (FIG. 7(a)). After setting the optical fiber, the division portion 34 is closed, and a state where the optical fiber is inserted in the ferrule 30 is achieved (FIG. 7(b)). The subsequent steps (FIGS. 7(b) to (d)) are the same as those in the manufacturing method described with reference to FIG. 5.

Embodiment 3

Figure 8:
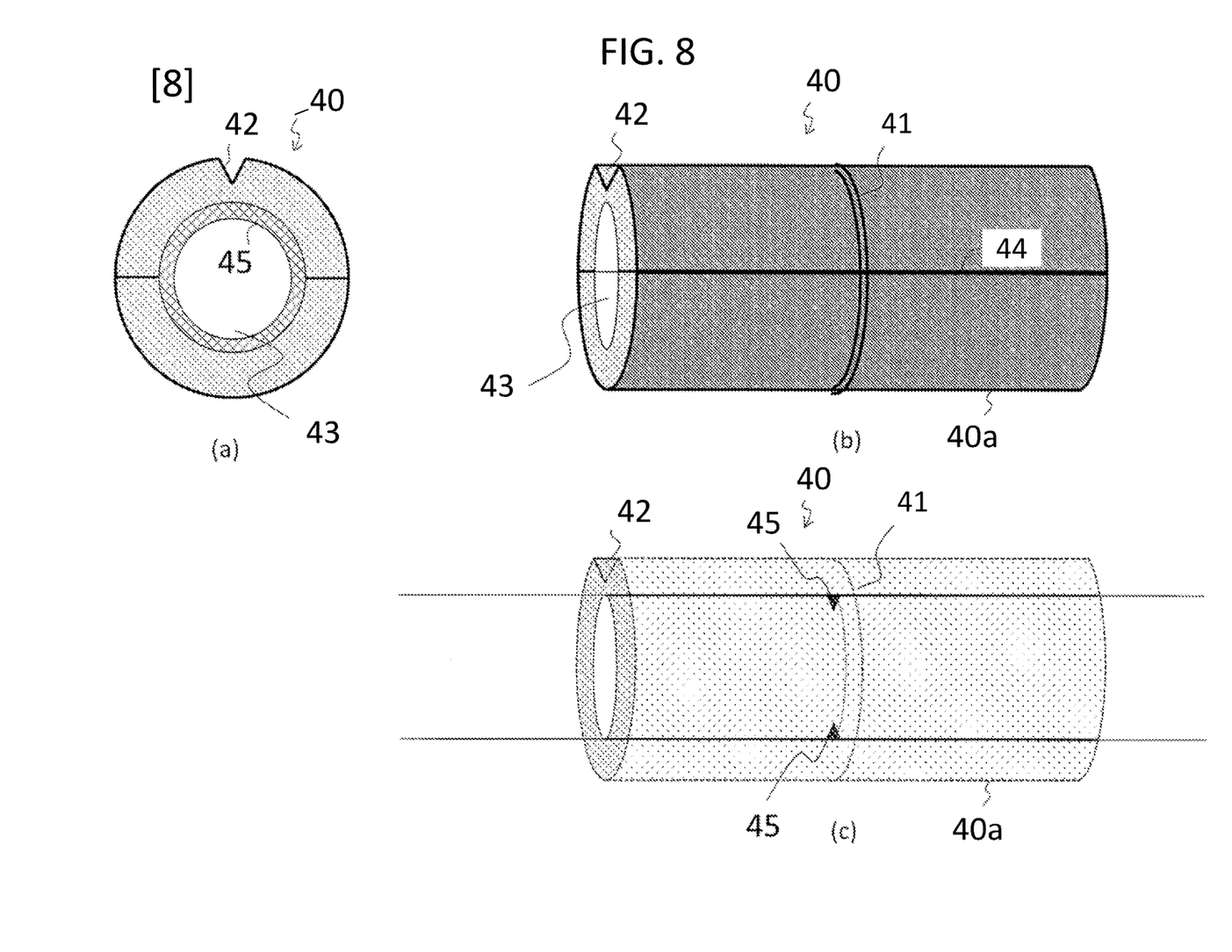
FIG. 8 is a view illustrating the optical connector ferrule according to the present invention, in which (a) is a front view, (b) is a perspective view, and (c) is a transparent view after inserting the multicore optical fiber.

FIG. 8 is a view illustrating an optical connector ferrule 40 according to this embodiment. The optical connector ferrule 40 is characterized in that the cylindrical member of the optical connector ferrule 21 described in Embodiment 1 has a protrusion 45, which is configured to enter the side surface of the coated optical fiber core wire, on an intersection line of a plane including the cut portion and an inner wall.

Like the structure of the optical connector ferrule 21 described in Embodiment 1 or the optical connector ferrule 30 described in Embodiment 2, the optical connector ferrule 40 has a cylindrical member 40a, an optical fiber through hole 43, a cut portion 41, a V-groove 42, and a division portion 44. The optical connector ferrule 40 furthermore has the cutting aid protrusion 45 formed at a central portion in the optical fiber through hole 43. The cutting aid protrusion 45 has a function of aiding the cutting of a set optical fiber.

A method for manufacturing a ferrule member using the optical connector ferrule 40 is the same as the steps in the method for manufacturing the ferrule member described with reference to FIG. 5 or FIG. 7. Here, the method for manufacturing a ferrule member has an advantage that the optical connector ferrule 40 includes the cutting aid protrusion 45, which facilitates division work in the cutting (FIG. 5(b) or FIG. 7(c)). A specific description will be given below. At the cutting, the optical connector ferrule is broken into two pieces along the cut portion by applying force to the optical connector ferrule but, due to the coating of the optical fiber core wire, which is resin, the optical fiber core wire is not broken along the cut portion, and the cutting plane of the ferrule and the cutting plane of the multicore optical fiber may not coincide with each other. The optical connector ferrule 40 includes the cutting aid protrusion 45 and, since the cutting aid protrusion 45 enters the coating of the optical fiber core wire at the stage of setting the optical fiber in the optical connector ferrule 40, the optical fiber core wire is broken from portions where the cutting aid protrusion 45 enters. Therefore, the optical fiber core wire can be broken along the cut portion at the cutting.

Embodiment 4

In the method of manufacturing an optical connector ferrule member, it is preferable to perform stretching to arrange the plurality of cores of the coated optical fiber core wire without a twist, and to perform the inserting, the cutting, and the polishing at a plurality of points in the longitudinal direction of the coated optical fiber core wire after the stretching.

Figure 9:
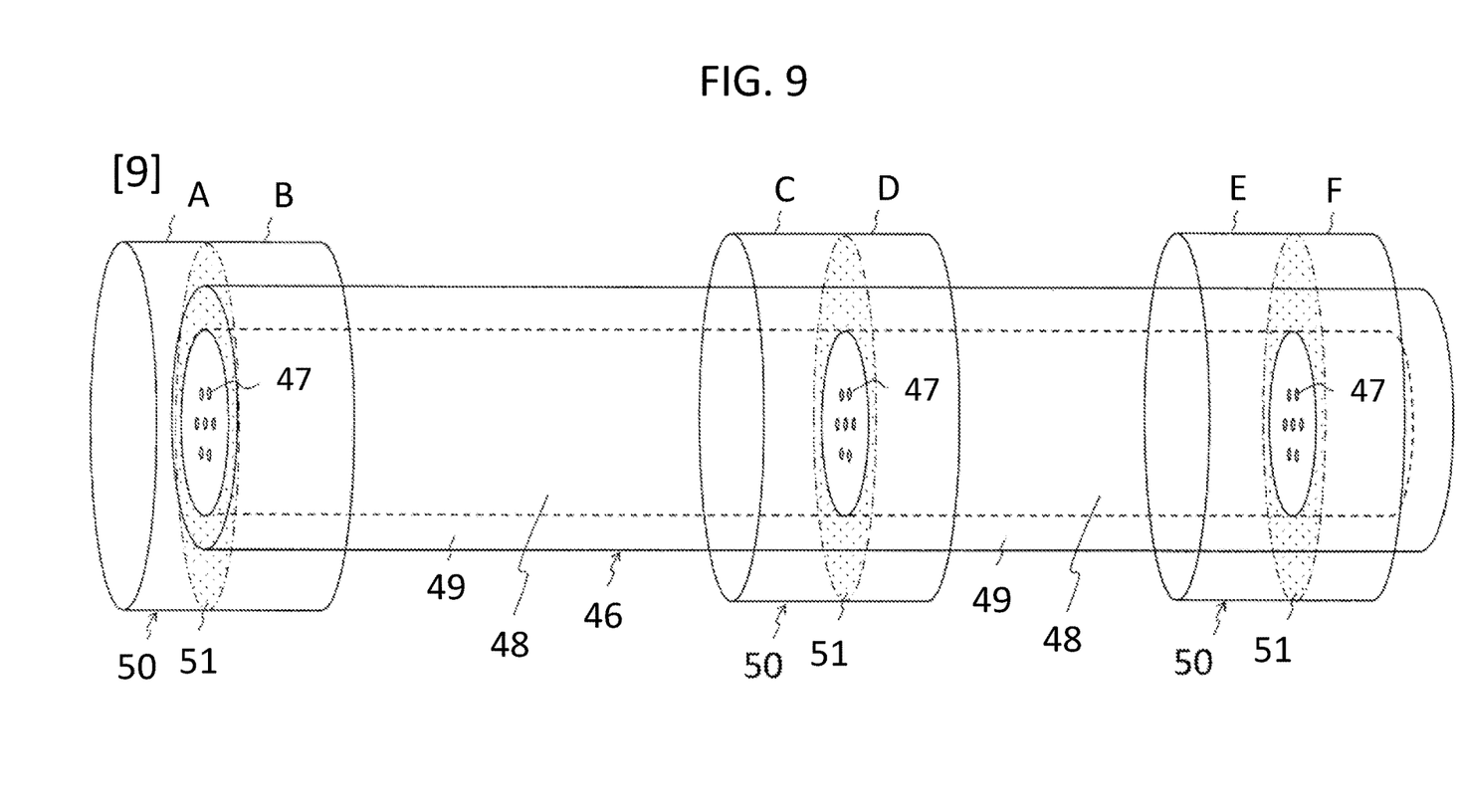
FIG. 9 is a view illustrating the method for manufacturing a ferrule member according to the present invention.

FIG. 9 is a view illustrating the stretching. When fixing a plurality of multicore optical fiber ferrules 50 to a multicore optical fiber 46, setting the multicore optical fiber 46 without a twist and making positions of the V-grooves on all the multicore optical fiber ferrules 50 the same result in the uniform alignment of cores 47 in the multicore optical fibers 46 in any of the multicore optical fiber ferrules 50 (eliminating deviations in a rotational direction). Thereafter, cutting each multicore optical fiber ferrule 50 at the cutting can realize interchangeable optical connectors. In other words, without the stretching, the ferrule members which can be connected as optical connectors are limited to A and B, C and D, or E and F, but performing the stretching enables the connection with any of the ferrule members.

Embodiment 5

Figure 10:
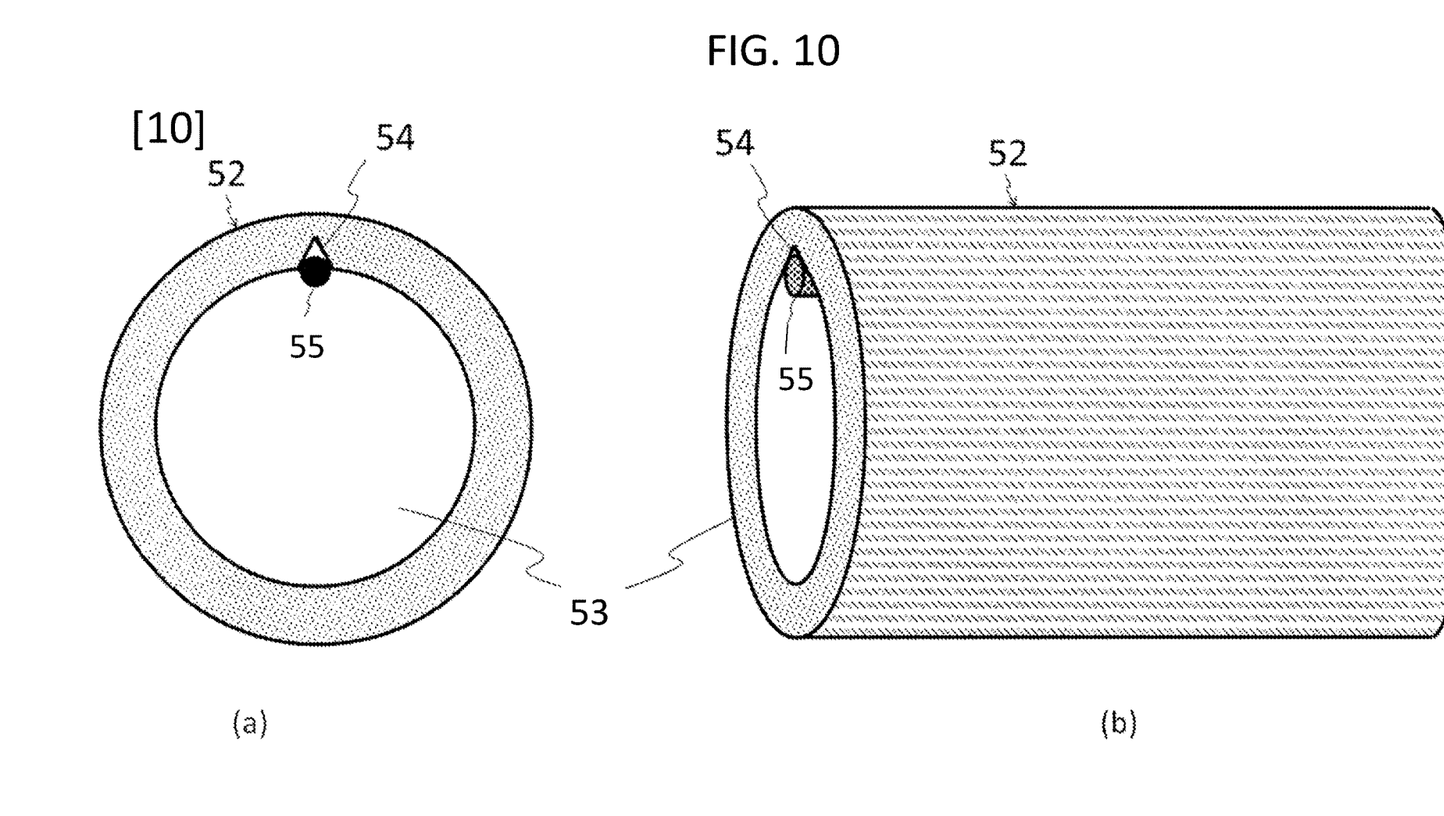
FIG. 10 is a view illustrating a sleeve according to the present invention.

FIG. 10 is a view illustrating an optical connector sleeve 52 according to this embodiment. A sleeve 52 includes:

a guide hole 53 into which the optical connector ferrule according to any of Embodiments 1 to 4 is inserted, the optical connector ferrule having been cut at the cut portion with the coated optical fiber core wire extending through the cylindrical member; and an alignment pin 55 which is arranged in the guide hole 53 and fitted in the V-groove.

The optical connector sleeve 52 is constituted of the ferrule guide hole 53 into which the ferrule member of the multicore optical fiber ferrule (21, 30, 40) is inserted to be guided, an alignment pin setting V-groove 54, and the alignment pin 55. The ferrule of the ferrule member inserted into the ferrule guide hole 53 is aligned in the rotational direction by the alignment pin 55 and the alignment V-groove (23, 32, 42) formed on the ferrule. This enables the alignment using an inner diameter of the sleeve as well as the alignment in the rotational direction.

Other Embodiments

Figure 11:
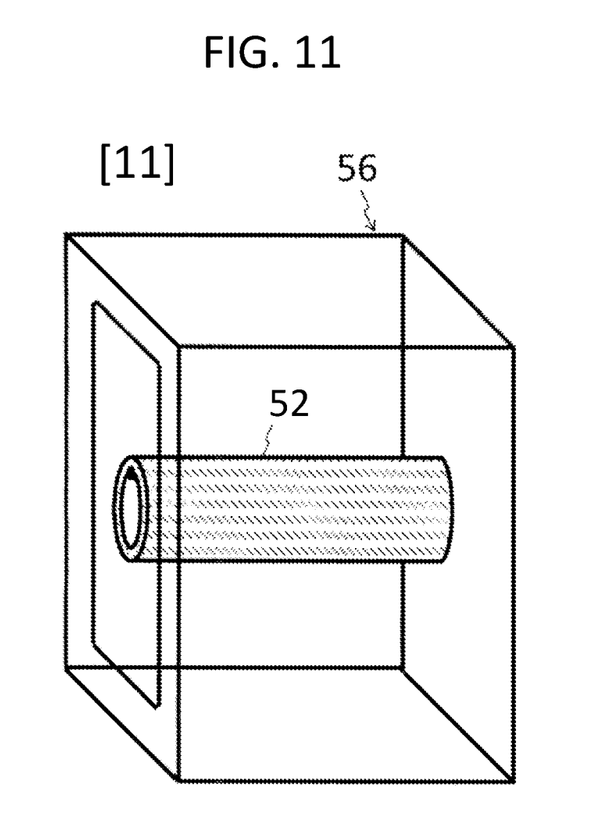
FIG. 11 is a view illustrating a multicore optical fiber adapter provided with the sleeve according to the present invention.
Figure 12:
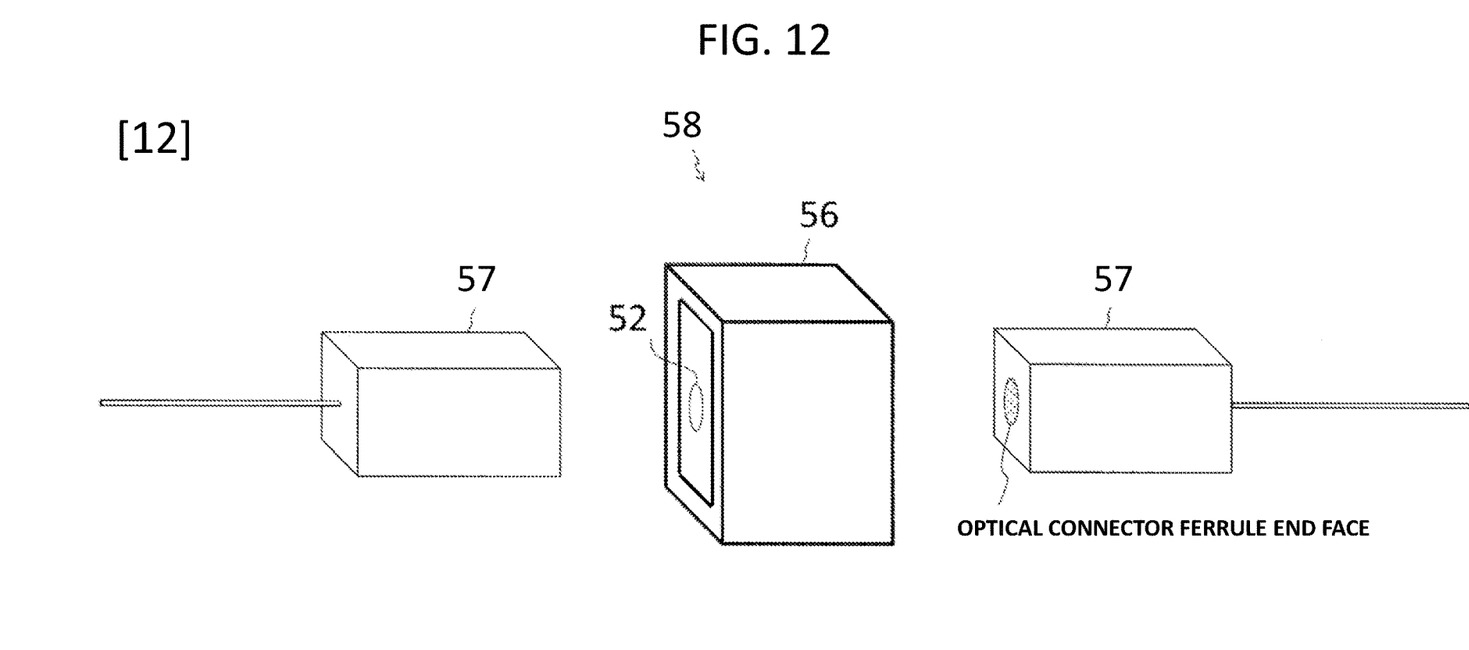
FIG. 12 is a view illustrating an optical connector including the multicore optical fiber adapter provided with the sleeve according to the present invention and multicore optical fiber optical connector plugs each provided with the optical connector ferrule according to the present invention.

FIG. 11 is a view illustrating a multicore optical fiber adapter 56 with the sleeve 52 described in Embodiment 5 mounted in a housing. Further, FIG. 12 is a view illustrating an optical connector 58 including optical connector plugs 57 each of which is fabricated by disposing a housing to the ferrule member manufactured using the optical connector ferrule described in Embodiments 1 to 4, and the adapter 56. Inserting the optical connector plugs 57 into the adapter 56 enables connecting end faces of the multicore optical fibers held by the optical connector plugs 57 to each other.

[Supplement]

The present invention is intended to simplify the alignment required for mounting the multicore optical fiber on the ferrule in the currently suggested optical connector configured to connect the multicore optical fibers.

(Means)

(1):

An optical connector ferrule characterized by having a hole, in which a coated optical fiber core wire is fixed, at a central portion of a cylindrical member, and having a V-groove for positioning along a side surface of a cylinder and a cut portion enabling dividing the cylinder into two at the central portion.

(2):

The optical connector ferrule according to (1), in which the cylindrical member further has a mechanism which axially divides the cylindrical member into two at the center.

(3):

The optical connector ferrule according to (1) or (2), further having a protrusion, which has a mechanism aiding the cutting of an optical fiber, on an internal diameter portion of an optical fiber through hole at the cut portion on the central portion of the cylindrical member.

(4):

A method for fabricating a ferrule member using the ferrule according to any of (1) to (3).

(5):

The method for fabricating a ferrule member according to (4), further including fixing the fiber so that the arrangement of cores become constant.

(6)

An optical connector adapter sleeve characterized by having a cylindrical hole configured to align and fix optical connector ferrules, and having a V-groove and a guide pin for positioning in a rotational direction of a circle.

(7):

An optical connector adapter incorporating the sleeve according to (6) therein.

(Effects)

Using the optical connector according to the present invention enables fabricating the optical connector ferrule member without the rotational alignment as in the conventional technology. However, at the time of mounting the ferrule on the optical fiber, a direction of the optical fiber must always be constant (the optical fiber must not rotate with respect to the axial direction of the optical fiber). However, even if this is impossible, the optical connector using the ferrule fabricated by this technique is restricted to a use application of connection only between the optical connector plugs fabricated from a pair of cut ferrules, but the economical optical connector only for a use application of connection can still be realized.

REFERENCE SIGNS LIST

1 SM type optical fiber core wire
2 SM type optical fiber
3 Core portion
4 Cladding portion
5 Coating portion
6 SM type optical fiber core wire
7 SM type optical fiber end face
8 Ferrule
9 Ferrule member
10 Sleeve
11 Housing
12 Optical connector plug
13 Adapter
14 Optical connector
15 Multicore optical fiber core wire
16 Multicore optical fiber
17 Core portion
18 Cladding portion
19 Coating portion
20 Multicore optical fiber
21 Optical connector ferrule
22 Ferrule cut portion
23 Alignment V-groove portion
24 Optical fiber through hole
25 Multicore optical fiber
26 Ferrule cutting plane
27 Multicore optical fiber cutting plane
28 Ferrule end face
29 Multicore optical fiber ferrule member
30 Optical connector ferrule
31 Ferrule cutting plane
32 Alignment V-groove portion
33 Optical fiber through hole
34 Division portion
35 Multicore optical fiber
36 Ferrule cutting plane
37 Multicore optical fiber cutting plane
38 Ferrule end face
39 Multicore optical fiber ferrule member
40 Optical connector ferrule
41 Ferrule cut portion
42 Alignment V-groove portion 43 Optical fiber through hole
44 Division portion
45 Cutting aid protrusion
46 Multicore optical fiber core wire
47 Core portion
48 Cladding portion
49 Coating portion
50 Multicore optical fiber ferrule member
51 Multicore optical fiber ferrule member cutting plane
52 Multicore optical fiber connector sleeve
53 Ferrule guide hole
54 Alignment pin setting V-groove portion
55 Alignment pin
56 Multicore optical fiber adapter
57 Multicore optical fiber plug
58 Multicore optical fiber connector

The invention claimed is:

1. An optical connector ferrule comprising:
a cylindrical member through which a coated optical fiber core wire including a plurality of cores extends;
a V-groove arranged on one bus of the cylindrical member; and
a cut portion notched on an outer side surface of the cylindrical member so as to be parallel to a bottom surface of the cylindrical member, wherein the cut portion is configured to be used to cut the cylindrical member together with the coated optical fiber core wire including the plurality of cores and extending through the cylindrical member.

2. The optical connector ferrule according to claim 1, wherein the cylindrical member is configured to be divided into two parts in a plane including a central axis.

3. The optical connector ferrule according to claim 2, wherein the cylindrical member has a protrusion on an intersection line of the plane including the cut portion and an inner wall, the protrusion being configured to enter a side surface of the coated optical fiber core wire.

4. The optical connector ferrule according to claim 1, wherein the optical connector ferrule is configured to be inserted into a sleeve through a guide hole in the sleeve, the optical connector ferrule having been cut at the cut portion with the coated optical fiber core wire extending through the cylindrical member; and
the sleeve further comprising an alignment pin arranged in the guide hole and fitted in the V-groove.

5. A method for manufacturing a ferrule member comprising:
inserting a coated optical fiber core wire including a plurality of cores into a cylindrical member of an optical connector ferrule;
cutting the cylindrical member, at a cut portion notched on an outer side surface of the cylindrical member so as to be parallel to a bottom surface of the cylindrical member, together with the coated optical fiber core wire extending through the cylindrical member after the inserting; and
polishing planes of the cylindrical member including the coated optical fiber core wire cut at the cutting.

6. The method for manufacturing the ferrule member according to claim 5, wherein
at the inserting, the cylindrical member is divided into two in a plane including a central axis of the cylindrical member, and the coated optical fiber core wire is sandwiched by halved cylindrical members obtained by the dividing to insert the coated optical fiber core wire into the cylindrical member.

7. The method for manufacturing the ferrule member according to claim 5, wherein
stretching to arrange the plurality of cores of the coated optical fiber core wire without a twist is performed, and the inserting, the cutting, and the polishing are performed to a plurality of points in a longitudinal direction of the coated optical fiber core wire after the stretching.

* * * * *